UNITED STATES PATENT OFFICE.

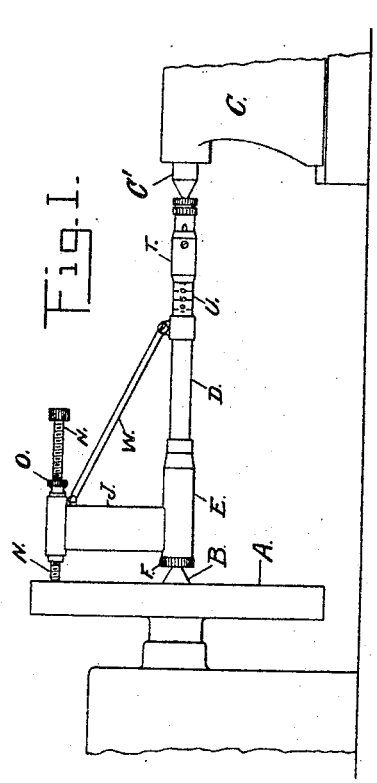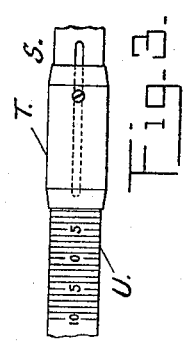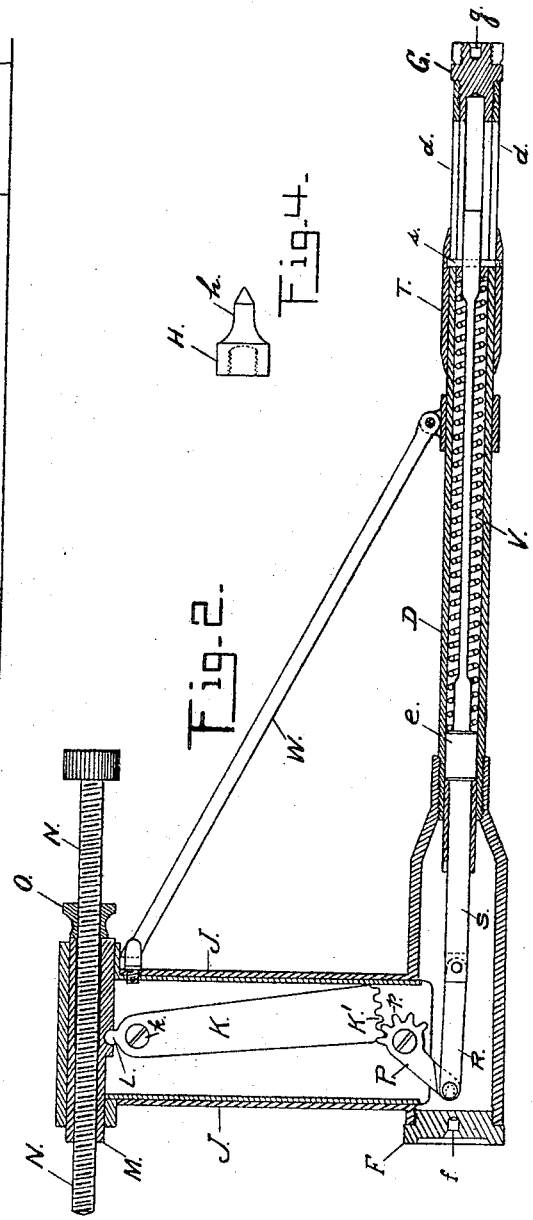

ADOLPH F. HENRIKSON, OF TROY, NEW YORK.

LATHE-CENTER INDICATOR.

No. 807,555. Specification of Letters Patent. Patented Dec. 19, 1905.

Application filed December 31, 1904. Serial No. 239,068.

*To all whom it may concern:*

Be it known that I, ADOLPH F. HENRIKSON, a citizen of the United States of America, and a resident of the city of Troy, county of Rensselaer, and State of New York, have invented certain new and useful Improvements in Lathe-Center Indicators, of which the following is a specification.

My invention relates to lathe-center indicators adapted to be applied to a lathe or milling-machine for the purpose of determining the proper position of the work to be operated upon, showing whether or not the table is in true alinement. I attain this object by means of the mechanism illustrated in the accompanying drawings, in which—

Figure 1 is an elevation; Fig. 2, an enlarged vertical section; Fig. 3, a plan, with parts broken away, of the indicating device. Fig. 4 is a plan of a nut provided with a centering projection.

Similar letters refer to similar parts throughout the several views.

The face-plate A of a lathe with a live-center B and the tail-center C are the parts of a machine constructed in the usual manner and which are simply shown in outline to indicate any lathe or milling apparatus.

For the purpose of indicating whether or not the work placed on the tail-center C is in alinement with the live-center B, I have provided an instrument consisting of a tube D, upon which there is threaded or otherwise secured an enlarged portion or tube E, provided with a cap F, in which cap is preferably arranged a centering-recess $f$ to admit the end of the live-center B in the face-plate A. The opposite end of the tube D is preferably provided with a guide-sleeve G, within the end of which may be constructed a recess $g$, adapted to engage a dead-center C' on the tail-center C. The end of the guide-sleeve G may be threaded to allow a nut H, Fig. 4, provided with a centering projection $h$, to be placed thereon when desired. The centering projection $h$ is arranged to engage with the tail-center when said tail-center has no dead-center C' attached thereto or to engage the work when the work is to be centered, hole-drilled, &c.

The enlarged portion of tube E, above referred to, is provided with a right-angled extension J, which extension is preferably a flattened tube, within which I suspend the lever K, fulcrumed near its upper end at $k$, and which lever has at its extreme upper end beyond the fulcrum $k$ a projecting portion L, adapted to engage with a reciprocating sleeve M. Through the sleeve M, I place the threaded adjustable bolt N, upon which is the adjusting-nut O. The end of the adjustable bolt N is adapted to engage with the face-plate A, and when regulated to make such engagement it is held in position in the sleeve by the nut O on the adjustable bolt N.

The lower end of the lever K is provided with a series of teeth K', which engage similar teeth $p$ on the lever P, fulcrumed in the right-angular extension J and so adjusted and connected up that the movement of the lever K under the direction of the reciprocating action of the sleeve M will operate the lever P and cause the link R, connected with said lever, to set in motion the piston S in the tube D. The piston S is connected near one of its ends, by means of a pin $s$ or in any suitable manner, with the reciprocating sleeve T, which sleeve T envelops a portion of the tube D. The pin $s$ extends through and is capable of reciprocating movement in the slots $d\,d$ in the tube D and in similar slots in the guide-sleeve G. The portion of the tube D adjacent to and with which the reciprocating sleeve T engages is graduated and a scale U formed thereon, as shown in Figs. 1 and 3, for the purpose of indicating the degree of movement of the reciprocating sleeve T under the influence of the piston S. On the piston S, within the tube D, I place a spring V, the resiliency of which will tend to force the reciprocating sleeve toward the enlarged tube E. The spring being seated against the shoulder $e$ on the piston in tube D at one end and engaging with end of the guide-sleeve G at the other end.

I preferably arrange the brace W extending from the tube D to the right-angled extension J.

The operation of my device is from the description given easily understood. When the centering-spindle B engages with the end of the enlarged tube E, as shown in Fig. 1, (its opposite end being engaged with the tail-center C,) and the adjustable bolt N is placed in contact with the face-plate A during the movement of the adjustable bolt N about the face-plate A, if there is any difference in the distance from the face-plate to the adjustable bolt N it will cause a movement of the tube M, lever K, and therefore sleeve T, which will be noted upon and the amount of such movement be determined by the scale U on the tube D.

What I claim as my invention, and desire to secure by Letters Patent, is—

1. In a lathe-center indicator; a tube adapted to be engaged at one end with the live-center of a lathe and at the other end with the tail-center; an adjustable bolt arranged to engage the face-plate; a bearing for said bolt supported by said tube; a lever operated by the reciprocating movement of said bolt; a piston; a connection between said piston and said lever, whereby the lever will transmit a reciprocating motion to said piston, a sleeve enveloping a portion of said tube, and a connection between said sleeve and piston, all substantially as described.

2. A lathe-center indicator, consisting of a tube; a reciprocating sleeve thereon; a piston connected with said sleeve; an adjustable bolt arranged to engage, near its circumference the face-plate of a lathe; a lever pivoted near said bolt; a means for operating said lever by the reciprocation of said bolt; a lever in operative connection with said first-mentioned lever, and with said piston whereby the movement of the bolt will cause the sleeve to move on the said tube, substantially as described.

3. In a lathe-center indicator; a tube having a hollow lateral extension; a piston; a sleeve connected with one end of said piston; a lever connected with the opposite end thereof; an adjustable bolt mounted in said extension to said tube; a lever operated by said bolt and in operative connection with the said first-mentioned lever, in such a manner that the movement of said bolt will cause the reciprocation of said sleeve on said tube, substantially as described.

4. In a lathe-center indicator; a tube; a guide-sleeve; a reciprocating sleeve; a piston; a means for connecting said sleeve and piston; a toothed lever in operative contact with said piston; a lever pivoted near its end provided with teeth engaging said toothed lever; a bolt; a means for adjusting said bolt in connection with the face-plate of a lathe; a means for imparting motion to said pivoted lever by the movement of said bolt, substantially as described.

Signed at Albany, New York, this 17th day of December, 1904.

ADOLPH F. HENRIKSON.

Witnesses:
FREDERICK W. CAMERON,
LOTTIE PRIOR.